United States Patent
Bains et al.

(10) Patent No.: US 11,062,491 B1
(45) Date of Patent: Jul. 13, 2021

(54) GRAPH PLOTTER AND REPLICATOR TOOL

(71) Applicant: Robert Bosch GmbH, Stuttgart (DE)

(72) Inventors: Baljit Bains, Canton, MI (US); Sam Kamal Balasubramanian, Tamil Nadu (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/986,890

(22) Filed: Aug. 6, 2020

(51) Int. Cl.
*G06T 11/20* (2006.01)
*G06F 3/0484* (2013.01)

(52) U.S. Cl.
CPC ........ *G06T 11/206* (2013.01); *G06F 3/04845* (2013.01); *G06T 2200/24* (2013.01)

(58) Field of Classification Search
CPC .............. G06T 11/206; G06T 2200/24; G06F 3/04845; G06F 30/12
See application file for complete search history.

(56) References Cited

U.S. PATENT DOCUMENTS

| | | | |
|---|---|---|---|
| 7,084,872 B2 | 8/2006 | Etgen et al. | |
| 7,106,330 B2 | 9/2006 | Liu et al. | |
| 8,284,199 B2 | 10/2012 | Minamide et al. | |
| 9,910,574 B2 | 3/2018 | Boekling et al. | |
| 2007/0156565 A1* | 7/2007 | Singer | G06F 3/0484 705/37 |
| 2009/0278848 A1 | 11/2009 | Robertson et al. | |
| 2010/0249976 A1* | 9/2010 | Aharoni | G05B 23/0229 700/110 |
| 2013/0176315 A1* | 7/2013 | Winkle | G06T 11/206 345/440 |
| 2014/0267292 A1 | 9/2014 | Ioffe | |
| 2017/0031870 A1* | 2/2017 | Grealish | G06T 11/206 |

* cited by examiner

*Primary Examiner* — Jeffery A Brier
(74) *Attorney, Agent, or Firm* — Michael Best & Friedrich LLP

(57) ABSTRACT

A CAD graph plotter and replicator tool may deliver a fast, accurate, and dynamically adjustable CAD graph that can be updated easily in real time when new data is introduced or extant data is updated. Features like scaling, point marking, point addition, smoothening, display of grid lines, range control, and quadrant control may be included to aid the user in generating the graph efficiently. The tool may also enable the user to control line thickness, color, type, legends, and decimal points in axis, among other features.

20 Claims, 11 Drawing Sheets

101a

| | Pressure | Volume | |
|---|---|---|---|
| 106a | | | 104a |
| 102a | 1.2 | 9.8 | 102a |
| | 2.4 | 7.5 | |
| | 3.7 | 5.6 | |
| | 4.9 | 3.4 | |
| | 5.2 | 2.1 | |

File | Home | Insert | Page Layout | Formulas | Data | Review

✂ Cut
📋 Copy
Paste ⌨ Format Painter

Arial  10  A A  B  I  U  ab

Clipboard | Font

D10    ✗ ✓ fx 105b   106b    107b

| | A | B | C | D |
|---|---|---|---|---|
| 1 | Pressure | Volume — 108b | | |
| 2 | 1.2 | 9.8 | | |
| 3 | 2.4 | 7.5 | | |
| 4 | 3.7 | 5.6 | | |
| 5 | 4.9 | 3.4 | | |
| 6 | 5.2 | 2.1 | | |
| 7 | | | | |
| 8 | | | | |

GRAPH PLOTTER AND REPLICATOR TOOL

FIELD

The present disclosure relates to an improved graphing tool.

BACKGROUND

Engineers often need to create graphs of data using a computer-aided design (CAD) tool. Producing a CAD graph from complex data is often done in anticipation of presentation for review by a business or management group.

SUMMARY

Frequently, research that may produce data pertinent to such a presentation is ongoing up until the date of presentation and sometimes is still ongoing during the presentation period. Accordingly, as the presentation period approaches, more data may be produced while extant data is refined and manually translated to a CAD graph to be presented. This entering of new data and updating of extant data and manual translation to a CAD graph may require a wasteful amount of approximation and repetitious, tedious interaction with a CAD tool by a skilled user. This is because existing CAD tools often lack responsive, dynamic graphing functions that would lessen the need for approximation or repetitive, duplicative actions of the CAD user. That is, the CAD user may need to peruse the underlying data of the graph and edit the correct data directly, and then redraw the CAD graph by manually translating the data into a CAD graph by approximating a visual representation of the underlying data.

Additionally, existing CAD tools produce graphs as images, and it is often the case that a graph image is inherited or received by an engineering team without the underlying data from which the original graph was manually translated. If the underlying data of the inherited or received graph is desired, the engineering team must either search for the underlying data, or attempt to reconstruct the underlying data from the inherited or received graph. This also creates an often tedious task of manually surmising or estimating the underlying data set of the inherited or received graph which may have been approximately drawn based on a lengthy and complex data set. Moreover, once this surmised or estimated data set is reconstructed from the inherited or received graph, the surmised or estimated data set may need to be repetitiously updated, added to, and translated to a CAD graph as described above.

Thus, the whole process of creating and updating a graph with existing CAD tools often requires a large commitment and effort often by skilled users. There is therefore a need for a CAD graphing tool that reduces the need for repetitious or tedious action by a skilled user for updating a CAD graph drawn from complex data sets by providing unique features catered to the efficient production of CAD graphs. Additionally, there is a need for a graphing tool that is capable of surmising or deriving a dataset approximating a data set from an inherited or received graph image. Further, there is a need for a CAD tool that automatically draws a CAD graph from an input data set, that a allows the user to update the underlying dataset of a CAD graph and results in an automatic update of the graph itself, that allows quick, automatic re-rendering or redrawing of a CAD graph when the underlying data is edited directly, and that allows a user to perform quick and intuitive actions like scaling, translating, quadrant control, range control, point marking, and smoothening of a CAD graph produced from underlying data.

In a number of embodiments, a CAD graph plotter and replicator tool may deliver a fast, accurate, and dynamically adjustable CAD graph that can be updated easily in real time when new data is introduced or extant data is updated. Features like scaling, point marking, point addition, smoothening, display of grid lines, range control and quadrant control may be included to aid the user in generating the graph efficiently. The tool may also give the user to control line thickness, color, type, legends and decimal points in axis, among other features.

One embodiment provides a CAD graph plotter and replicator tool including an input-output interface, a memory, and an electronic processor coupled to the input-output interface and the memory. In this embodiment, the electronic processor is configured to: identify first and second outermost data points from a set of data points. The electronic processor deduces graph parameters based upon the first outermost data point and second outermost data point, and determines a relative position of each data point from the set of data points within a graph bounded by the graph parameters. A contextualized set of data points for representation on a scalable graph is generated by the electronic processor, and scalable 2d graphical representations of the contextualized set of data points is drawn by the electronic processor on a 2d scalable graph.

Another embodiment provides a method of producing a 2d scalable CAD graph including using an electronic processor to identify first and second outermost data points from a set of data points. The electronic processor then deduces graph parameters based upon the first outermost data point and second outermost data point, and determines a relative position of each data point from the set of data points within a graph bounded by the graph parameters. Finally, a contextualized set of data points for representation on a scalable graph is generated by the electronic processor, and scalable 2d graphical representations of the contextualized set of data points is drawn by the electronic processor on a 2d scalable graph.

Another embodiment provides a non-transitory, computer-readable medium containing instructions that, when executed by an electronic processor, are configured to perform a set of functions including: identifying first and second outermost data points from a set of data points, deducing graph parameters based upon the first outermost data point and second outermost data point, determining a relative position of each data point from the set of data points within a graph bounded by the graph parameter, generating a contextualized set of data points based upon the relative positions of the data points, and drawing scalable 2d graphical representations of the contextualized set of data points on a 2d scalable graph.

Other aspects of the invention will become apparent by consideration of the detailed description and accompanying drawings.

BRIEF DESCRIPTION OF THE DRAWINGS

FIG. 2a depicts a data entry pane having data points according to a number of embodiments.

FIG. 2b depicts a tabular input or output file having data points according to a number of embodiments.

FIG. 4b depicts a 2d scalable CAD graph, drawn by a CAD graph plotter and replicator tool in accordance with the toggle selected in FIG. 4a.

FIG. 5b depicts a 2d scalable CAD graph, drawn by a CAD graph plotter and replicator tool in accordance with the toggles selected in FIG. 5a.

FIG. 6b depicts a 2d scalable CAD graph, drawn by a CAD graph plotter and replicator tool in accordance with the toggles selected in FIG. 6a.

FIG. 7b depicts a 2d scalable CAD graph, drawn by a CAD graph plotter and replicator tool in accordance with the toggles selected in FIG. 7a.

FIG. 8b depicts a 2d scalable CAD graph, drawn by a CAD graph plotter and replicator tool in accordance with the toggles selected in FIG. 8a.

DETAILED DESCRIPTION

Before any embodiments are explained in detail, it is to be understood that the embodiments are not limited in their application to the details of construction and the arrangement of components set forth in the following description or illustrated in the following drawings. Embodiments are capable of other configurations and of being practiced or of being carried out in various ways.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B. As used herein "line" may refer to a curved line as well as a straight line.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
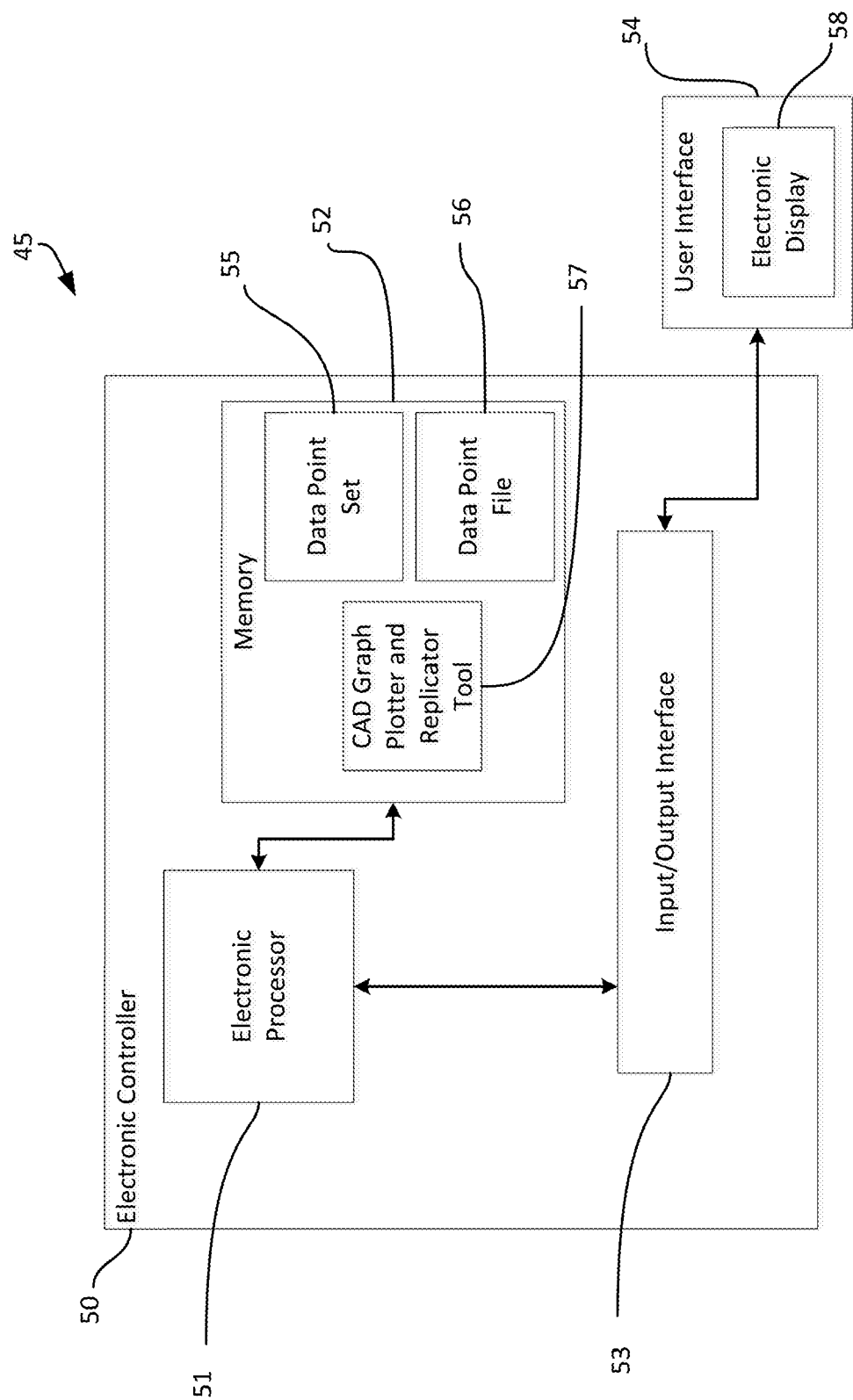
FIG. 1 is a block diagram of a system incorporating a CAD graph plotter and replicator tool, according to a number of embodiments.

FIG. 1 is a block diagram of a system 45 incorporating a computer-aided design (CAD) graph plotter and replicator tool 57, according to a number of embodiments. The system 45 includes an electronic controller 50. The electronic controller 50 may include a plurality of electrical and electronic components that provide power, operation control, and protection to the components and modules within the electronic controller 50. In the example illustrated, the electronic controller 50 may include, among other things, an electronic processor 51 (such as a programmable electronic microprocessor, microcontroller, distributed or local multi-processor, or similar device), a memory 52 (for example, non-transitory, machine readable memory), and an input/output interface 53.

The electronic processor 51 is communicatively connected to the memory 52 and the input/output interface 53, and the input/output interface 53 is communicatively connected to a user interface 54. In some embodiments, the memory 52 includes a data point set 55 or data point file 56 containing data points represented or to be represented in a two-dimensional (2d) scalable CAD graph. The memory 52 may also include instructions executable to implement a CAD graph plotter and replicator tool 57. During execution by the electronic processor 51, the CAD graph plotter and replicator tool 57 may take the data point set 55 or data point file 56 as input. The input/output interface 53 may also obtain user input received via the user interface 54, and provide the user input to the electronic processor 51, for example, during the operation of the CAD graph plotter and replicator tool 57.

The user interface 54 may include, for example, one or more of a keyboard, trackpad, computer mouse, display, touchscreen, speaker, microphone, and the like. For example, as illustrated, the user interface 54 includes an electronic display 58, which may be a liquid crystal display, light emitting diode (LED) display, touch screen display, or the like. In some embodiments, the electronic display 58 is configured to display a scalable 2d CAD graph, as discussed in further detail herein. The electronic controller 50 may be housed on the same device as the electronic display 58, or the electronic display 58 may be part of a remote computing system accessible over a network such as, but not limited to, a cloud computing service or a web service, or a combination thereof. Similarly, the memory 52 may be volatile or non-volatile memory, or a combination thereof and may also be local accessible or remotely accessible over a network via a cloud storage service or data center. The electronic processor 51, in coordination with the memory 52 the input/output interface 53, the user interface 54, and electronic display 58 may thus be configured to implement, among other things, the methods described herein. Functions described herein as being performed by the CAD graph plotter and replicator tool 57 should be understood to, at least in some embodiments, be performed by the electronic processor 51 executing the CAD graph plotter and replicator tool 57.

In a number of embodiments, the CAD graph plotter and replicator tool 57 is configured to deliver a fast, accurate, and dynamically adjustable or scalable 2d CAD graph that can be updated easily in real time when new data is introduced or extant data is updated. Features like scaling, point marking, smoothening, grid lines, range control and quadrant control may be included to aid the user in generating the graph efficiently. The tool 57 may also give the user the ability to control plot line thickness, plot line color, plot line type, plot legends, and value granularity in an axis rule. A 2d scalable CAD graph may comprise individually selectable and scalable vector elements such as, but not limited to, vector lines and shapes. In certain circumstances, the 2d scalable nature of the graph may allow for the CAD graph plotter and replicator tool 57 to simply rescale and redraw the underlying data points on which a 2d scalable CAD graph is based rather than upscaling an image or re-resolving and redrawing an entire 2d graph in response to a rescaling request. The nature of the rendering engine for the CAD graph plotter and replicator tool 57 may allow for this and any redrawing or rendering may occur via a drawing module of the CAD graph plotter and replicator tool 57.

In a number of embodiments, a CAD graph plotter and replicator tool 57 takes an excel sheet, a csv file, a tabular note, or any other form of table-format file or direct input via a graphical user interface as input data. An interpretation module of the CAD graph plotter and replicator tool 57 may automatically determine the organization of the input data and deduce labels and parameter limits from the input data. In some cases, the interpretation module of the CAD graph plotter and replicator tool 57 determines that the input data merits display on multiple, overlapping axes. The interpretation module may also determine data points and the plot location of each data point from the input data, based on the parameters of the input data itself or based upon user specification via a graphical user interface. The CAD graph plotter and replicator tool 57 may then use CAD graphics such as, but not limited, to vector graphics to draw a 2d scalable CAD graph from the input data.

In a number of embodiments, a CAD graph plotter and replicator tool 57 is a plugin to an existing CAD drawing suite. In a number of embodiments, the CAD graph plotter and replicator tool 57 is a standalone software that is accessed via a desktop icon, an app icon, an execution prompt, or any other known method of selection of direct execution of software. In a number of embodiments, the CAD graph plotter and replicator tool 57 may be a web-based product that allows input of data points, files, or images for 2d scalable CAD graph plotting or replication via a server-client relationship. In some cases, a CAD graph plotter and replicator tool 57 is configured to produce a 2d scalable CAD graph within an existing CAD drawing suite or within a standalone CAD program in accordance with the methods, features, and products described herein. This 2d scalable CAD graph may be exportable as an appropriate CAD file type for use with other CAD drawing suites or viewing software. The CAD graph plotter and replicator tool 57 may also be configured to facilitate the export of a 2D scalable CAD graph as a non-scalable image having a static resolution.

In a number of embodiments, the graphing tool 57 is configured to automatically draw a 2d scalable CAD graph using scalable CAD graphics such as, but not limited to, vector graphics based upon a set of input data points. This 2d scalable CAD graph may be constructed by use of an algorithm that contextualizes the input data points by determining the relative positions of the input data points within a frame of input data parameters deduced by the CAD graph plotter and replicator tool 57 in light of the outermost data points along X and Y axes. In some cases, the input data parameters are also defined by user selection or input rather than being deduced by the algorithm. In a number of embodiments, the algorithm organizes the input data points according to a scheme such as, but not limited to, organizing the data points according to ascending order of X-value, according to descending order of Y-value, according to reverse sequence of entry or appearance in input, or some other organization according to a mathematical or logical formula, and create a 2d scalable CAD graph by drawing scalable lines between neighboring data points. However, in other embodiments, this re-organization is not performed. Each end of each line may be associated with an underlying data point by the CAD graph plotter and replicator tool 57. Additionally, each underlying data point may be associated with the end of at least one 2d scalable CAD graph line. Two neighboring scalable lines may meet at a vertex point between a first neighboring data point and a second neighboring data point. Such a vertex point in the 2d scalable CAD graph may be mathematically associated with an underlying data point within the input data points. In some cases, plot lines may be drawn curved to give the 2d scalable CAD graph a smoothened appearance. The degree of smoothening effect applied to the plot lines may be adjusted by a user via a user interface. In some cases, any 2d scalable smoothened lines may drawn alongside the original plot lines or points. In this way, a user can readily identify how closely the 2d scalable smoothened lines approximate the original plot lines. Both the 2d scalable smoothened lines and the original plot lines may both be associated with the underlying data points.

In a number of embodiments, the 2D scalable CAD graph is editable in that the graph itself may be modified by a user via a graphical user interface. For example, the 2D scalable CAD graph is displayed to a user via a graphical interface shown on the display 58. A user then edits the 2d scalable CAD graph by interacting with the displayed CAD graph via the user interface 54 by a click-and-drag action, a point-and-click action, keystrokes, or any other known type of electronic input via a connected mouse, a keyboard, a trackball, a graphics drawing pad, a touchscreen, a trackpad, or any other known device or method for interacting with a graphical user interface. The CAD graph plotter and replicator tool 57 may mathematically relate the underlying data points to the 2d scalable CAD graph such that the underlying data points are mathematically manipulated in response to a user editing the displayed 2d scalable CAD graph via the user interface 54. As a non-limiting example, a user may select, via the user interface 54, a vertex in a 2d scalable CAD graph created by the products or methods described herein. The user may drag the vertex of the of the 2d scalable CAD graph to change the appearance of the graph. This editing of a vertex of the 2d scalable CAD graph may be reflected in an automatic update or mathematical manipulation of the underlying data point associated with the vertex. That is, the change made to the graphically represented vertex may result in a proportional change to the associated underlying data point. This proportional change may be according to a mathematical relationship between the graphical representation of the point as a vertex and the representation of the underlying data point as a numerical figure within a dataset from which the 2d scalable CAD graph is drawn.

In a number of embodiments, a CAD graph plotter and replicator tool 57 allows a user to manipulate a 2d scalable CAD graph associated with underlying data points by modifying the underlying data points or adjusting the interpretation of the input data points by the CAD graph plotter and replicator tool 57. The user may be able to access the underlying input data points from a graphical interface on the electronic display 58 such as, but not limited t,o an integrated toolbox feature within the CAD graph plotter and replicator tool 57. As a non-limiting example, the user may edit the numerical values of the underlying input data points and, as a result, the 2d scalable CAD graph associated with the underlying data points may be redrawn by the CAD graph plotter and replicator tool 57 according to a predetermined mathematical relationship between the drawn CAD graph and the underlying data points. As another non-limiting example, the user may rescale the 2d scalable CAD graph by using an integrated toolbox feature of the CAD graph plotter and replicator tool 57 to do so. This rescaling may occur according to the scalable nature of the scalable 2d CAD graph, which may be rendered in a scalable graphical form such as, but not limited to, vector graphics, but may also occur as a result of an adjustment of the mathematical relationship between the underlying data points and the drawn, scalable 2d CAD graph. Any such adjustment may induce the scalable 2d CAD graph to be re-rendered or redrawn as appropriate by a drawing module of the CAD graph plotter and replicator tool 57. For example, a CAD graph plotter and replicator tool 57 may originally determine based upon a default scale value of one for the X Axis that each X-value for each underlying data point should be multiplied by ten to account for a data point to X Axis rule value ratio on a display, and must also be shifted by twenty-five pixels to account for the location of the drawn CAD graph in order to provide a proper pixel location for each underlying data point X-value. If, in such a case, the X-axis scale value is changed from one to two, the mathematical relationship may be changed to induce a multiplication of X-values in the underlying data points by twenty to account for a new rescaled location of the drawn data points in the rescaled 2d scalable CAD graph. A drawing module of the CAD graph plotter and replicator tool 57 may then redraw the 2d scalable CAD Graph according to the adjusted X-axis scale. The same may be done for rescaling of the Y-axis.

In a number of embodiments, a CAD graph plotter and replicator tool 57 is configured to take an image of a graph as input and derive approximated underlying data points therefrom. The CAD graph plotter and replicator tool 57 may draw a new graph as a 2D scalable CAD graph from these derived underlying data points. Deriving the underlying data points may occur according to an extraction algorithm such as but not limited to a known vectorization algorithm. The extraction algorithm may be programmed to identify and contextualize the input image's axes, axes rules, and plot line or plot points. In this way, the extraction algorithm may determine and generate appropriate underlying data points for the input image based upon the location of the plot lines or points in relation to the axes in the image.

In a number of embodiments, a CAD graph plotter and replicator tool 57 has an add point feature. A user may select an add point tool from an integrated toolbox feature and also select a point on a scalable 2d CAD graph drawn by the CAD graph plotter and replicator tool 57 to place the new point. The user may also directly enter coordinate values for the new point in the add point feature within the integrated toolbox feature of the CAD graph plotter and replicator tool 57. In the former case, the CAD graph plotter and replicator tool 57 may retrieve the coordinates of the selected point on the scalable 2d CAD graph and translate these coordinates to a data point position on the scalable 2d CAD graph. This data point position may be entered into the appropriate organizational position of a table, file, or structure in which the underlying data points are kept by the CAD graph plotter and replicator tool 57. The CAD graph plotter and replicator tool 57 may redraw the scalable 2d CAD graph with the inclusion of this new data point. In the case of a user directly entering the new data point by a coordinate value, this coordinate value may be translated by the CAD graph plotter and replicator tool 57 into a data point position on the scalable 2d CAD graph. This data point position may be entered into the appropriate organizational position of a table, file, or structure in which the underlying data points are kept by the CAD graph plotter and replicator tool 57, and the CAD graph plotter and replicator tool 57 may redraw the scalable 2d CAD graph with the inclusion of this new data point.

In a number of embodiments, a CAD graph plotter and replicator tool 57 has features for affecting the display format of the graph and that do not modify the underlying data points. For example, the CAD graph plotter and replicator tool 57 may generate a graphical interface on the electronic display 58 for accepting user input. The graphical interface may include an integrated toolbox feature that contains a number of toggles affecting a plurality of display features. The integrated toolbox feature may include toggles for displaying or hiding particular features on any scalable 2d graph produced by the CAD graph plotter and replicator tool 57. As a non-limiting example, the integrated toolbox feature may include toggles for showing or hiding grid lines, axis rules, plot legends, or data point intercepts. Similarly, the integrated toolbox feature may include toggles for simply showing or hiding items related to or drawn from the underlying data points. As a non-limiting example, the integrated toolbox feature may include toggles for showing or hiding plot points, plot lines, smoothened versions of the plot lines, and toggles to shift the positions of the axes of the 2d scalable CAD graph. As a non-limiting example, a toggle may induce the axes of the 2d scalable CAD graph to positions where the axes will not cross through the plot lines or points.

FIG. 2a depicts a data entry pane 101a of a CAD graph plotter and replicator tool 57. The data entry pane 101a may be displayed on the electronic display 58 as part of a graphical user interface generated by the tool 57. Data points 102a may be directly entered into the data entry pane 101a as input to the CAD graph plotter and replicator tool 57 via the user interface 54. An X Axis label 106a (e.g., "Pressure") may be entered at the top of an X Axis data column 107a. Similarly a Y Axis label 104a (e.g., "Volume") may be entered at the top of a Y Axis data column 105a. The CAD graph plotter and replicator tool 57 may extract the data points 102a as well as the X axis label 106a and Y axis label 104a from the data pane 101a, store them in the memory 52 as the data point set 55, and draw a 2d scalable CAD graph (e.g., for display on the electronic display 58) having a scalable, labeled X axis and scalable, labeled Y axis based upon the data points 102*a* extracted from the data entry pane 101*a* and the X axis label 16*a* and Y Axis label 104*a*. The CAD graph plotter and replicator tool 57 may also draw 2d scalable representations of each of the data points 102*a* in the entry pane 101*a* in appropriate positions along the X and Y axis. In doing so, the CAD graph plotter and replicator tool 57 may create a 2d scalable CAD graph of the data points 102*a*. Additionally, the CAD graph plotter and replicator tool 57 may automatically draw appropriately spaced, numerically valued tick marks along the X and Y axis in light of the scale of the 2d scalable CAD graph as well as the range of the data points 102*a*.

FIG. 2*b* depicts an input file 101*b* containing a table 102*b* of input data points 103*b* for a 2d CAD graph plotter and replicator tool 57 to plot. The input file 101*b* may be a tabular note, a csv file, an XML file, or any other file translatable to a table, which may be stored as the data point file 56 in the memory 52. The CAD graph plotter and replicator tool 57 may identify an X Axis Label 104*b* and a Y Axis Label 106*b* at a predetermined location in the input file 101*b*. In the embodiment depicted, the predetermined location for the X Axis Label 106*b* is at the top of the X Axis data column 105*b*, while the predetermined location for the Y Axis Label 108*b* is at the top of the Y Axis data column 107*b*. The CAD graph plotter and replicator tool 57 may identify the file type of the input file 101*b* and extract the data points 103*b* as well as the X axis label 104*b* and Y axis label 106*b* from the input file 101*b*, saving them in the memory 52 as the data point set 55. The CAD graph plotter and replicator tool 57 draw a 2d scalable CAD graph having a scalable, labeled X axis and scalable, labeled Y axis based upon the extracted data points 103*b* and the X axis label 106*b* and Y Axis label 108*b*. The CAD graph plotter and replicator tool 57 may also draw 2d scalable representations of each of the data points 103*b* in the table 102*a* in appropriate positions along the X and Y axis. In doing so, the CAD graph plotter and replicator tool 57 may create a 2d scalable CAD graph of the data points 103*b*. Additionally, the CAD graph plotter and replicator tool 57 may automatically draw appropriately spaced, numerically valued tick marks along the X and Y axis in light of the scale of the 2d scalable CAD graph as well as the range of the data points 103*b*.

Figure 2C:
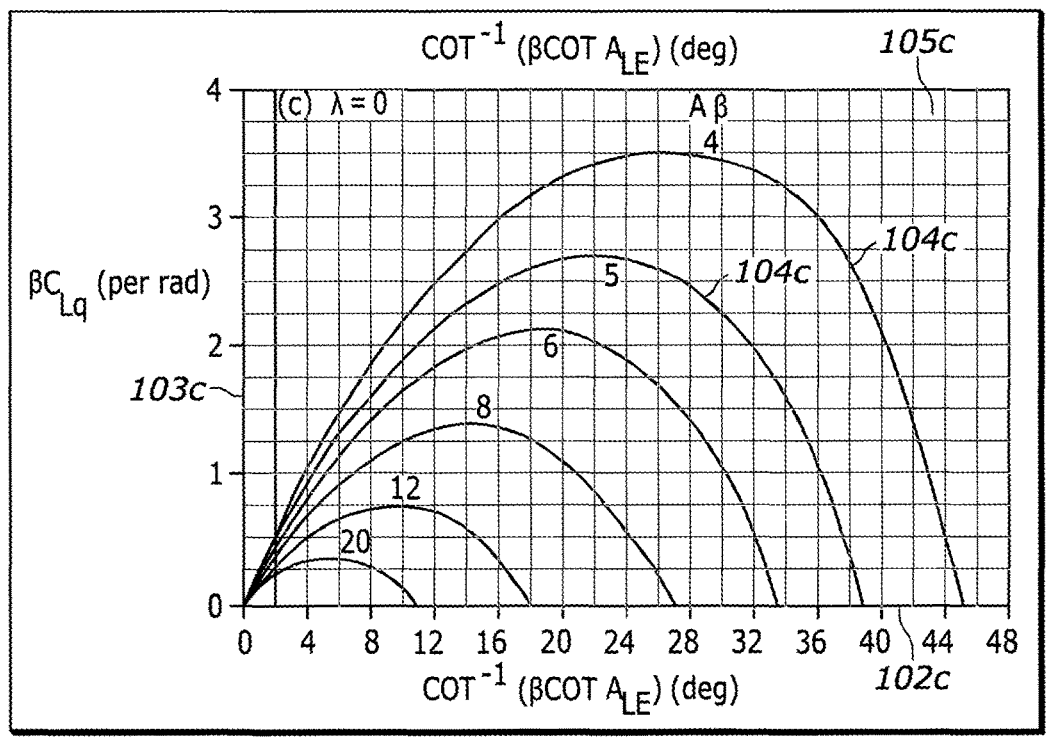
FIG. 2c depicts a graph image having a plurality of plot lines, which may be replicated according to a number of embodiments.
Figure 2D:
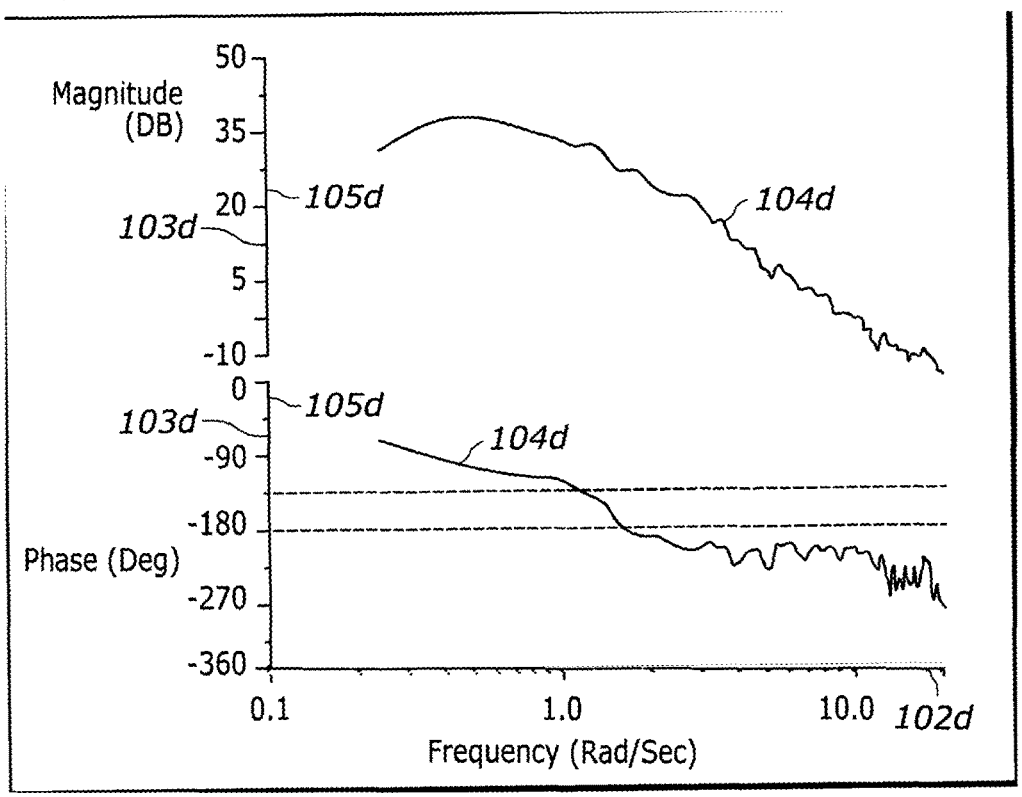
FIG. 2d depicts a graph image having a plurality of plot lines and a plurality of axes and axis rules, which may be replicated according to a number of embodiments.

FIG. 2*c* and FIG. 2*d* depict graph images that may be submitted as inputs to a CAD graph plotter and replicator tool 57. The graph images may be received via the input/output interface 53 (e.g., in the form of an image file) and stored in the memory 52. The CAD graph plotter and replicator tool 57 may identify within a graph image 101*c*, 101*d* any X Axes 102*c*, 102*d*, and any Y Axes 103*c*, 103*d*. The CAD graph plotter and replicator tool 57 may replicate the identified X Axes 102*c*, 102*d*, and Y Axes, 103*c*, 103*d* with 2d scalable graphics. This replication may include tick marks, values, and labels that appear on an axes within a graph image 101*c*, 101*d*. The graph plotter and replicator tool 57 may also identify plot lines 104*c*, 104*d* or plot points (not shown) within a graph image 101*c*, 101*d*. The CAD graph plotter and replicator tool 57 may replicate the identified plot lines 104*c*, 104*d* or plot points with 2d scalable graphics. Moreover, the CAD graph plotter and replicator tool 57 may replicate the identified plot lines 104*c*, 104*d* or plot points by identifying a relationship between each plot line 104*c*, 104*d* or plot point and any values along each of any X Axes 102*c*, 102*d* as well as a relationship between each plot line 104*c*, 104*d* or plot point and any values along each of any X Axes 103*c*, 103*d*. The CAD graph plotter and replicator tool 57 may use these identified relationships to build an approximated underlying data point set for a graph image 101*c*, 101*d*. The approximated underlying data point set for the graph compiled or built by the CAD graph plotter and replicator tool 57 in light of a submitted graph image 101*c*, 101*d* may be stored in the memory 52 as the data point set 55, which, as previously noted, may be a local memory, a memory of a local server or data center, or a memory used for rapid access via a remote service such as a fast-access cloud or database service etc. Similarly, the approximated underlying data point set 55 may be used to populate an output file such as, but not limited to, a tabular note, a csv file, an XML file, or any other file translatable to a table. The resulting output file may appear similar to an input file 101*b* described with regard to FIG. 2*b*. The CAD graph plotter and replicator tool 57 may draw a 2d scalable CAD graph by using the approximated underlying data point sent as input. In doing so, the CAD graph plotter and replicator tool 57 maintain the features of the graph image 101*c*, 101*d* such as but not limited to grid lines 105*c*, or stacked or multiple axes 105*d*. Similarly, the CAD graph plotter and replicator tool 57 may determine that a graph image 101*c*, 101*d* as originally drawn includes plot lines 104*c*, 104*d* or plot points. The CAD graph plotter and replicator tool 57 may reproduce this feature of the original graph image 101*c*, 101*d* by drawing plot lines 104*c*, 104*d* or plot points in the 2d scalable CAD graph produced in light of the graph image 101*c*, 101*d*. In some cases, however, the CAD graph plotter and replicator tool 57 may be programmed to not reproduce such features by default.

Figure 3A:
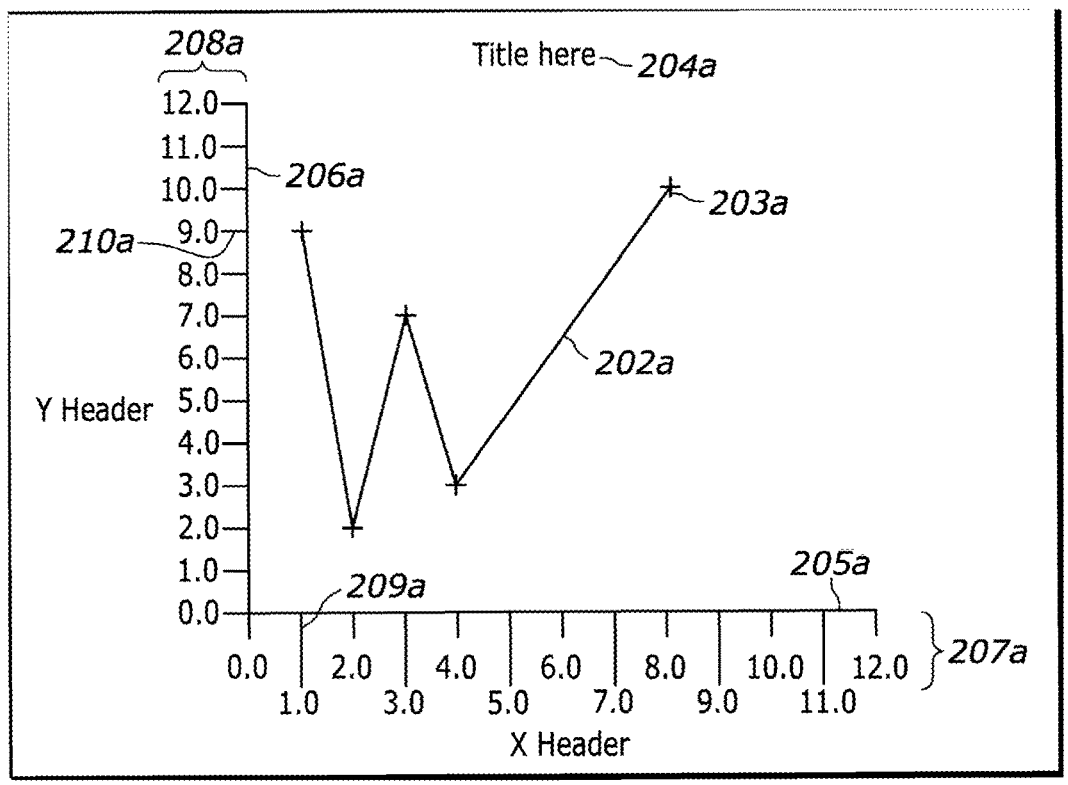
FIG. 3a depicts a scalable two-dimensional (2d) CAD graph before its scale is adjusted using an integrated toolbox feature of a CAD graph plotter and replicator tool.
Figure 3B:
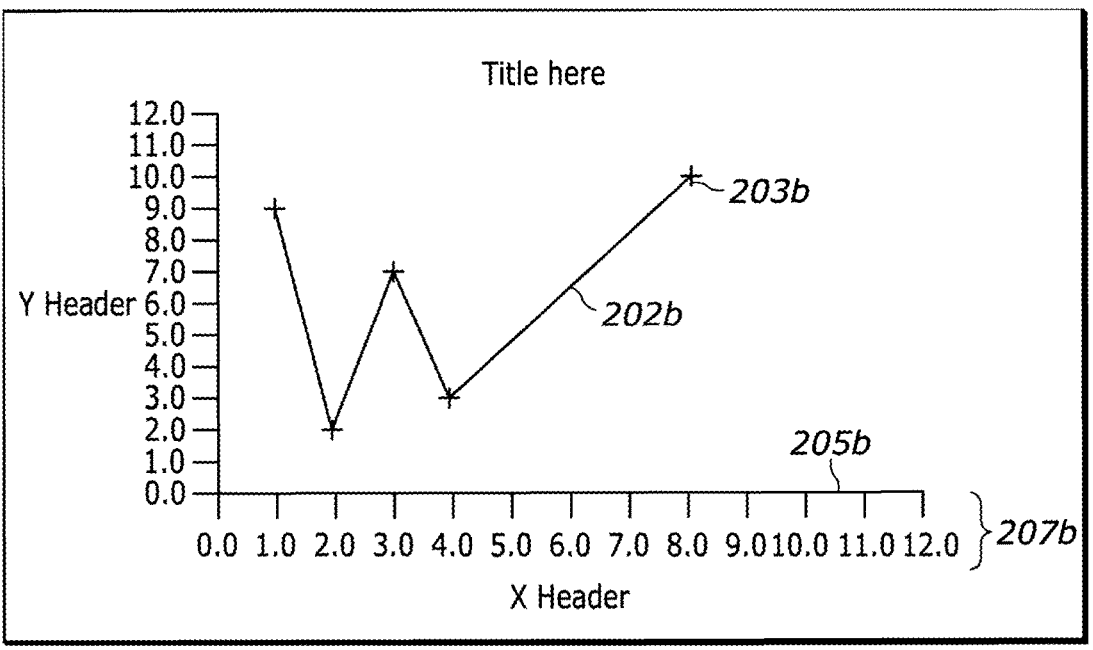
FIG. 3b depicts a scalable 2d CAD graph after its scale is adjusted using an integrated toolbox feature of a CAD graph plotter and replicator tool.
Figure 3C:
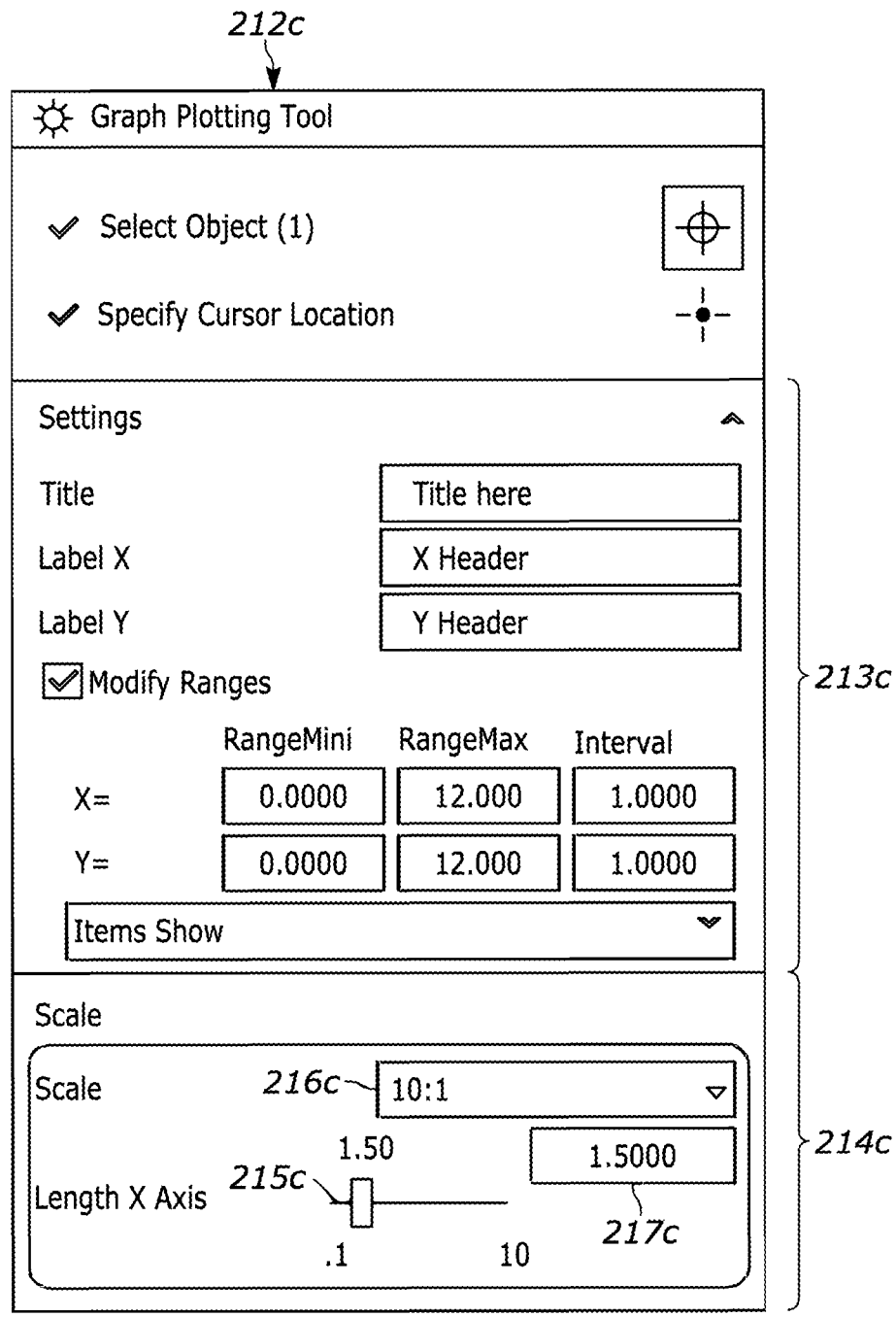
FIG. 3c depicts a number of scaling and labeling features of an integrated toolbox feature of a CAD graph plotter and replicator tool.

Referring now to FIG. 3*a* and FIG. 3*c*, FIG. 3*a* depicts a scalable 2d CAD graph 201*a* before its scale is adjusted using an integrated toolbox feature 212*c* (see FIG. 3*c*) of the CAD graph plotter and replicator tool 57. The 2d scalable CAD graph may be drawn by the CAD graph plotter and replicator tool 57 from a set of input data points 102*a*, 103*b* and may comprise a number of scalable lines 202*a* and points 203*a*. In some cases, the input data points 102*a*, 103*b* is derived from an input graph image 101*c*, 101*d*. The 2d CAD graph 201*a* may comprise a title 204*a* that may be derived from a file containing the input data points 102*a*, 103*b*, or input directly by a user via an entry pane 101*a* or the integrated toolbox feature 212*c* in a settings pane 213*c* shown in FIG. 3*c*. The 2d CAD graph 201*a* may also comprise a scalable X axis 205*a* and a scalable Y axis 206*a*. The X axis 205*a* may be drawn by the CAD graph plotter and replicator tool 57 with an X axis rule 207*a*, and the Y axis 206*a* may be drawn with a scalable Y axis rule 208*a*. The number of ticks 209*a* on the X axis rule 205*a* may be assumed by an interpretation module of the tool 57 as part of contextualizing the set of input data points 102*a*, 103*b*. The number of ticks 209*a* on the X axis rule 205*a* may also be set by a user of the CAD graph plotter and replicator tool 57 via an integrated toolbox feature 212*c* of the CAD graph plotter and replicator tool 57. Similarly, the number of ticks 210*a* on the Y axis rule 206*a* may be assumed by an interpretation module as part of contextualizing the set of input data points 102*a*, 103*b* or set by a user of the CAD graph plotter and replicator tool 57 via an integrated toolbox feature 212*c* of the CAD graph plotter and replicator tool 57. The integrated toolbox feature 212*c* may include a scale pane 214*c* comprising user inputs such as an axis scale slider 215*c* for adjusting the scale of a single axis, a scale ratio dropbox 216*c* for selecting a ratio to apply to the relative scaling of the X axis 205*a* to the Y axis 206*a*, or a single axis scale entry space 217c that allows a user to precisely input a desired scale for a single axis. Each of these scaling features may be used to change the scale of the scalable 2d graph 201a.

Referring now to FIG. 3b, a scalable 2d CAD graph 201b is shown with a 150% rescaling of the X axis 205a. The 150% scaling of the X axis 205a via the axis scale slider 215c in the scale pane 214c of the integrated toolbox feature 212c of the CAD graph plotter and replicator tool 57 has induced a drawing module of the CAD graph plotter and replicator tool 57 to re-render or redraw the 2d CAD graph 201a as rescaled 2d CAD graph 201b including a rescaled X axis 205b and X axis rule 207b, rescaled plot lines 202b, and plot points 203b with rescaled placement along the X axis 205b.

Figure 4A:
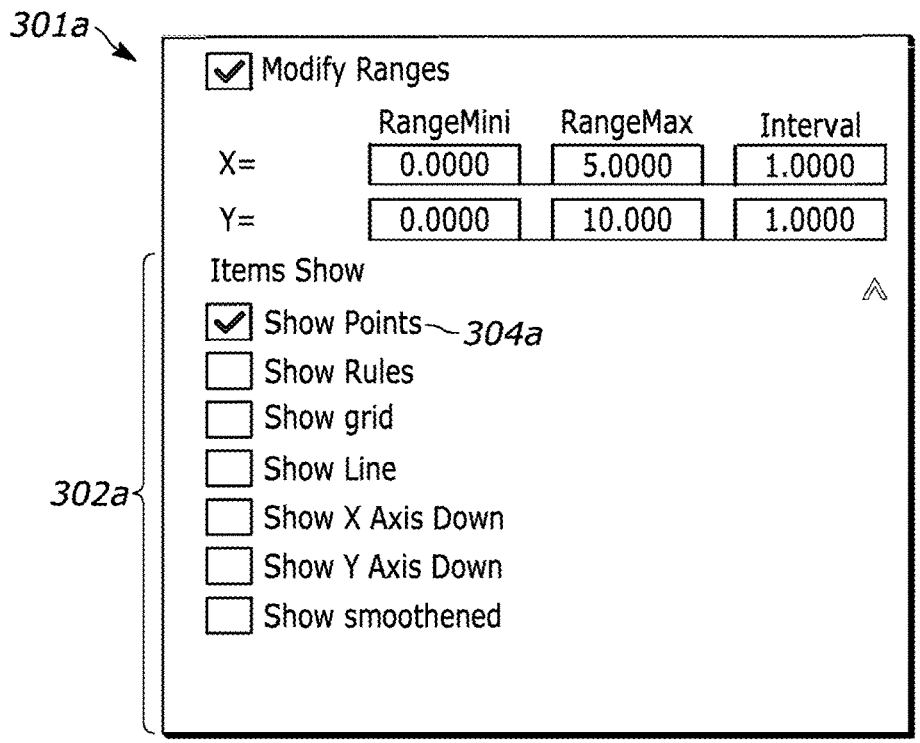
FIG. 4a depicts an integrated tool box feature, comprising a number of toggles, wherein a single toggle is selected.
Figure 4B:
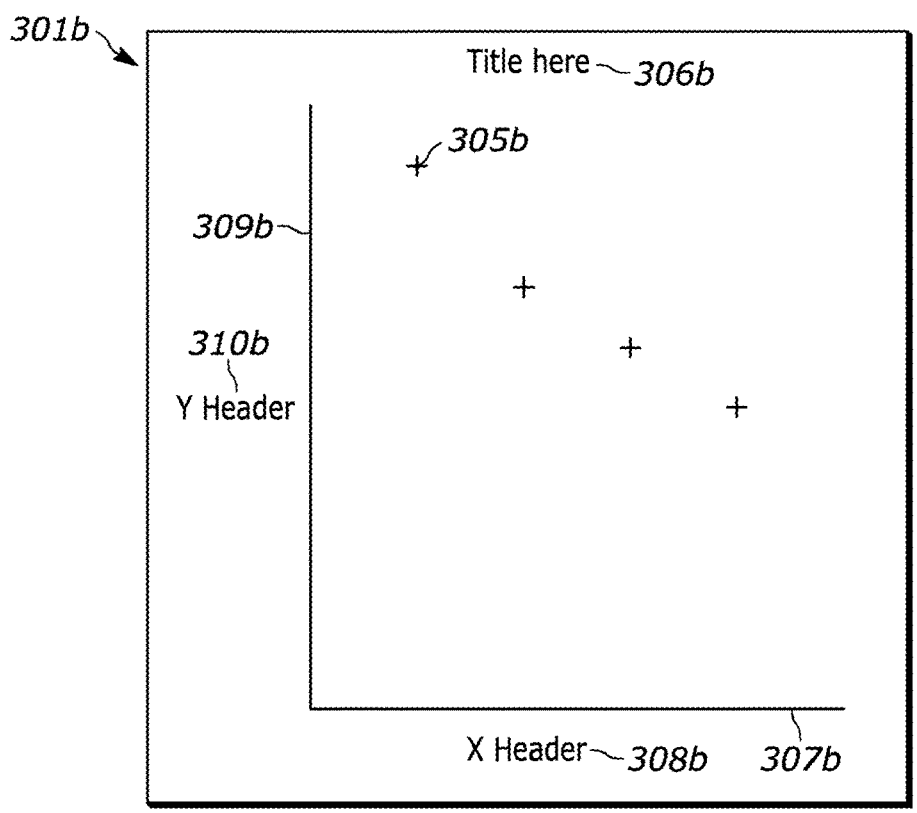

Referring now to FIG. 4a and FIG. 4b, a show items pane 301a within the integrated toolbox feature 212c may allow a user to show or hide points, rules, a grid, or a plot line in the associated 2d CAD graph 301b via a toggle array 302a. The selection or deselection of any of the toggles in the toggle array 302a may induce the CAD graph plotter and replicator tool 57 to redraw the 2d CAD graph including or excluding these features. In the embodiments shown in FIGS. 4a, 4b, only the show points toggle 304a from the toggle array 302a has been selected, thus in the embodiments shown, the 2d CAD graph 301b is drawn by a CAD graph plotter and replicator tool 57 from underlying data points 102a, 103b in 2d scalable graphics with only plot points 305b, a chart title 306b, an X Axis 307b, an X Axis label. 308b, a Y Axis 309b, a Y Axis label 310b, and no rules on the X Axis 306b or Y Axis 307b, no grid lines, and no plot lines.

Figure 5A:
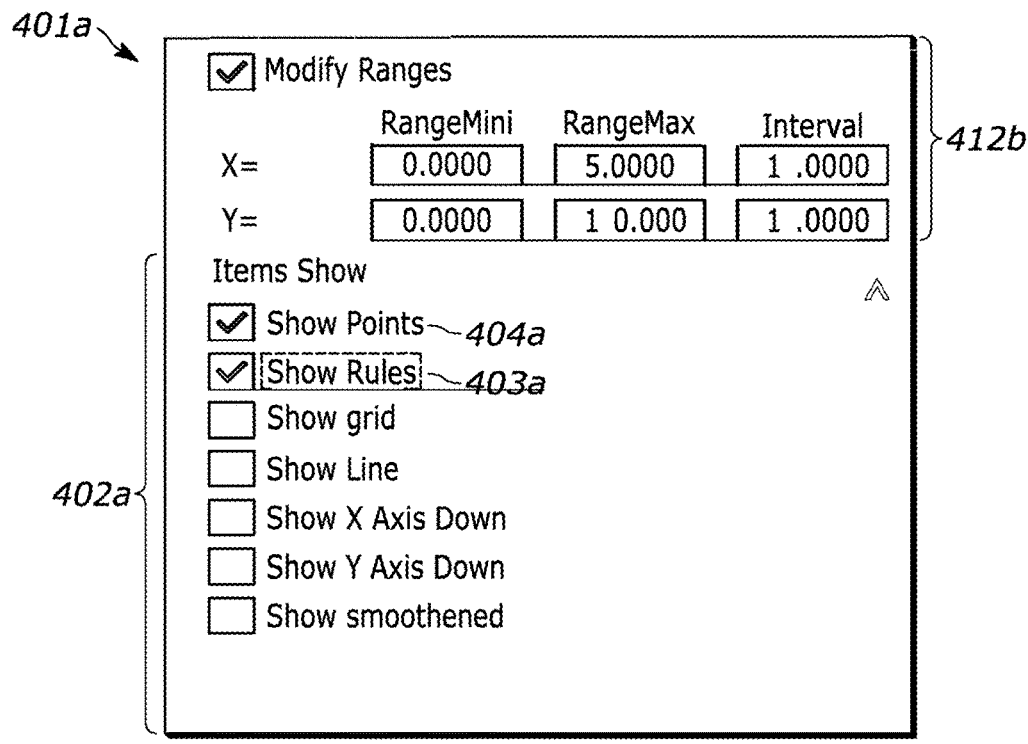
FIG. 5a depicts an integrated tool box feature, comprising a number of toggles, wherein a two toggles are selected.
Figure 5B:
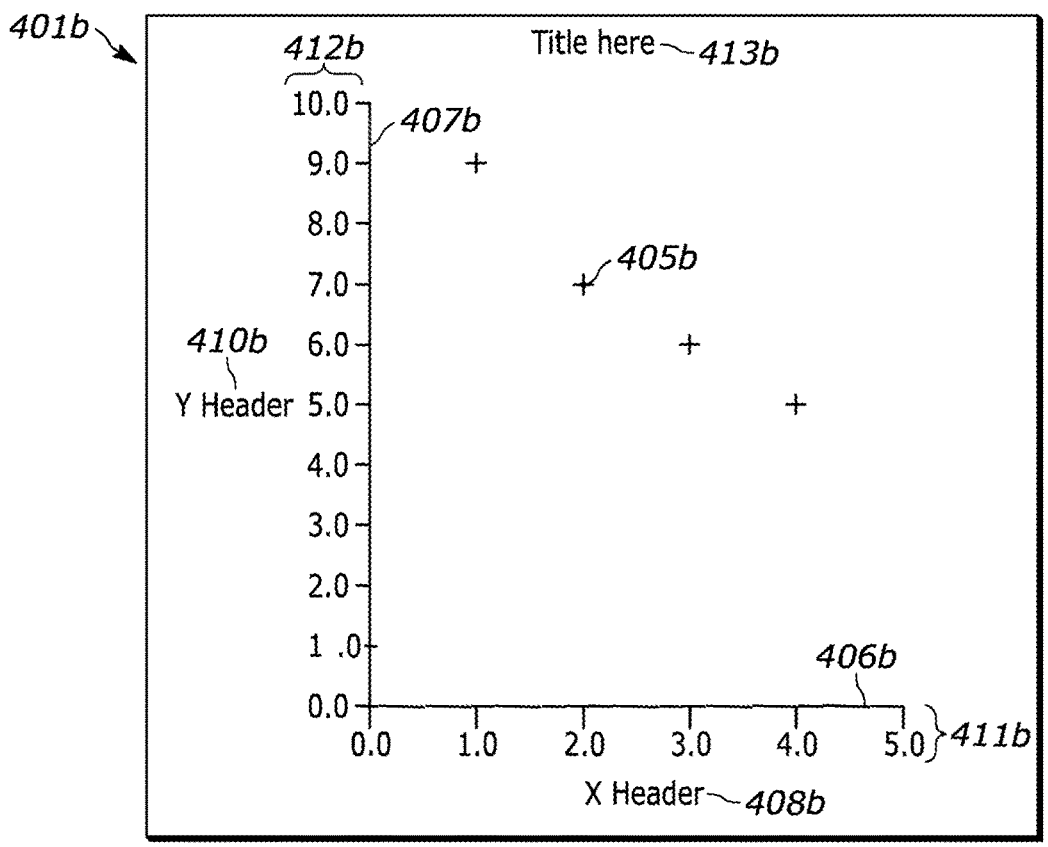

Referring now to FIG. 5a and FIG. 5b, a show items pane 401a within the integrated toolbox feature 212c is again depicted in relation to a 2d scalable CAD graph 401b drawn by a CAD graph plotter and replicator tool 57 from underlying data points 102a, 103b. In the embodiments shown in FIGS. 5a, 5b, the show points toggle 404a as well as the show rules toggle 403a from the toggle array 402a have been selected, thus in the embodiments shown, the 2d CAD graph 401b is drawn by a CAD graph plotter and replicator tool 57 from underlying data points 102a, 103b in 2d scalable graphics with plot points 405b, an X Axis 406b, an X Axis rule 411b, a Y Axis 407b, a Y Axis rule 412b, a chart title 413b, an X axis label 408b, a Y axis label 410b, but still no grid lines or plot lines. In the embodiments shown, it can be seen that a range modification pane 412b of the toolbox feature 212c may be used to limit or extend the range of the drawn, scalable 2d plot points 405b as well as limiting or extending the range of the drawn, scalable 2d X Axis 406b and X Axis rule 411b, and the drawn, scalable 2d Y Axis 407b and Y Axis rule 412b.

Figure 6A:
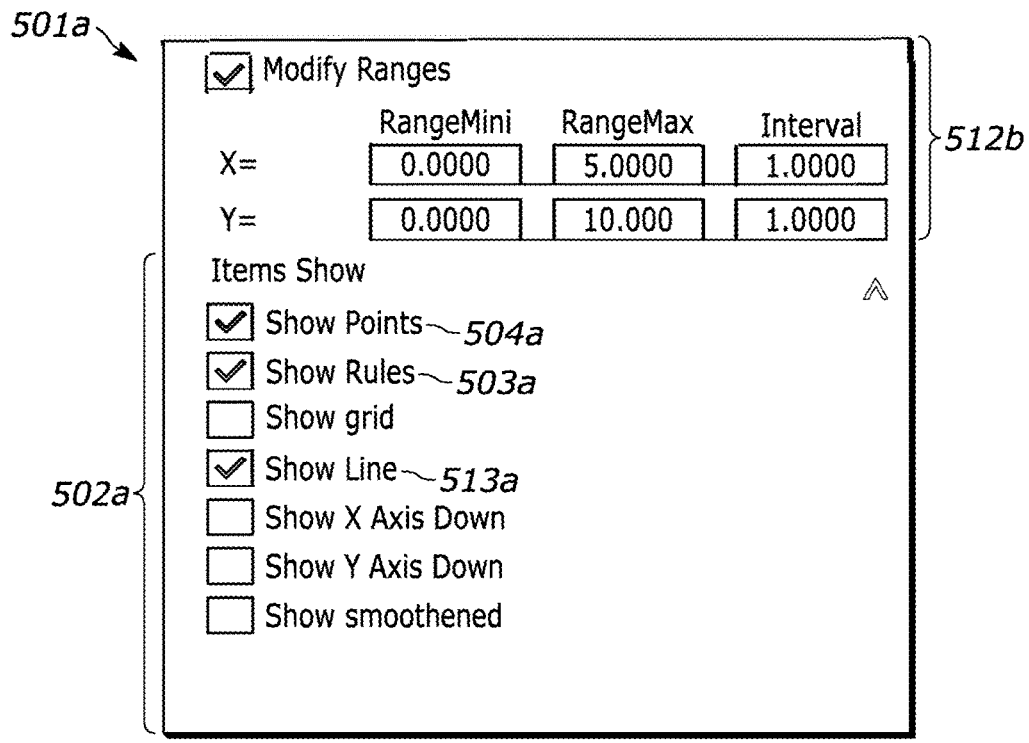
FIG. 6a depicts an integrated tool box feature, comprising a number of toggles, wherein a three toggles are selected.
Figure 6B:
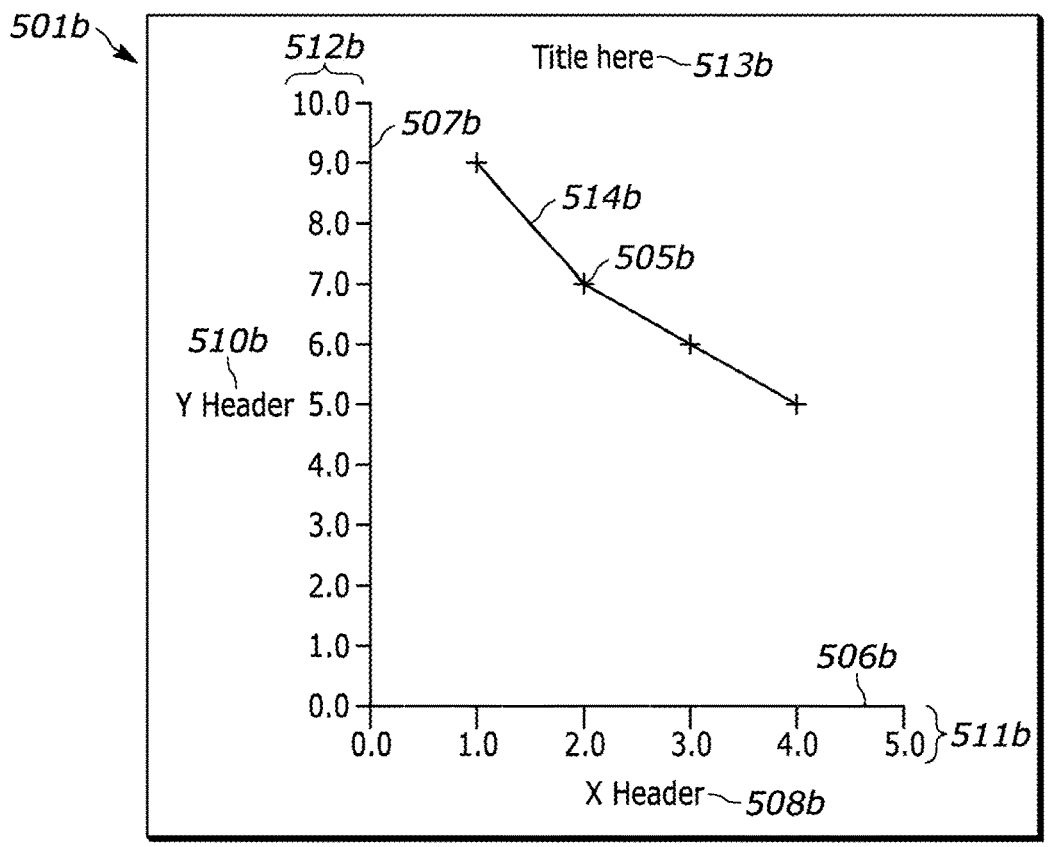

Referring now to FIG. 6a and FIG. 6b, a show items pane 501a within the integrated toolbox feature 212c is once more depicted in relation to a 2d scalable CAD graph 501b drawn by a CAD graph plotter and replicator tool 57 from underlying data points 102a, 103b. In the embodiments shown in FIGS. 6a, 6b, the show points toggle 504a as well as the show rules toggle 503a and show line toggle 513a from the toggle array 502a have been selected, thus in the embodiments shown, the 2d CAD graph 501b is drawn by a CAD graph plotter and replicator tool 57 from underlying data points 102a, 103b in 2d scalable graphics with plot points 505b, plot lines 514b, an X Axis 506b, an X Axis rule 511b, a Y Axis 507b, a Y Axis rule 512b, a chart title 513b, an X axis label 508b, a Y axis label 510b, but no grid lines. In the embodiments shown, it can be seen that a range modification pane 512b of the toolbox feature 212c may be used to limit or extend the range of the drawn, scalable 2d plot points 405b and drawn, scalable 2d plot lines 514b, as well as limiting or extending the range of the drawn, scalable 2d X Axis 506b and X Axis rule 511b, and the drawn, scalable 2d Y Axis 507b and Y Axis rule 512b.

Figure 7A:
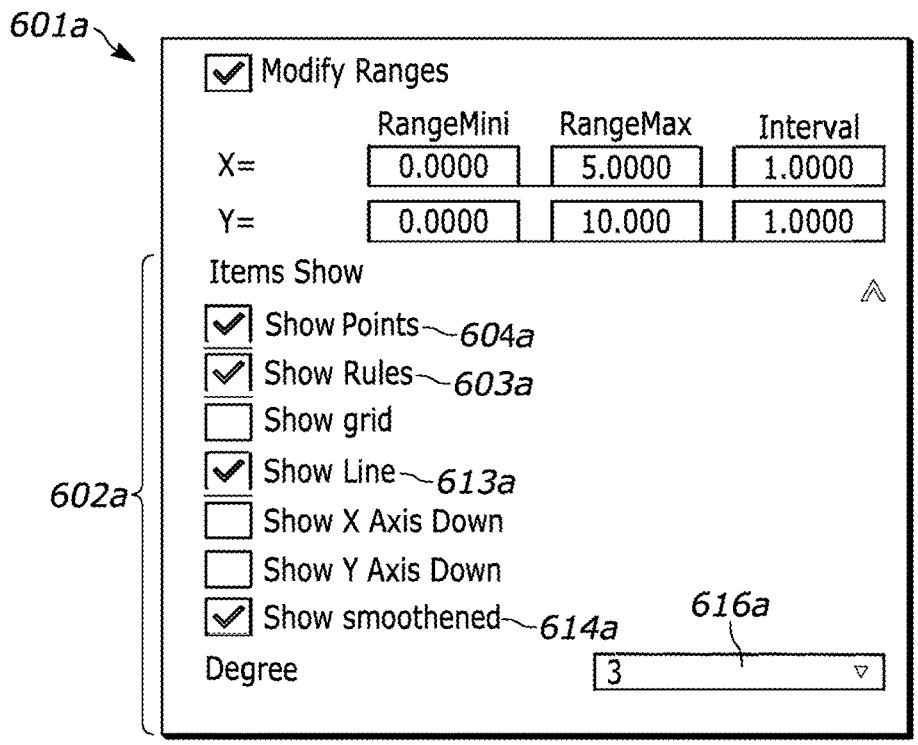
FIG. 7a depicts an integrated tool box feature, comprising a number of toggles, wherein a four toggles are selected.
Figure 7B:
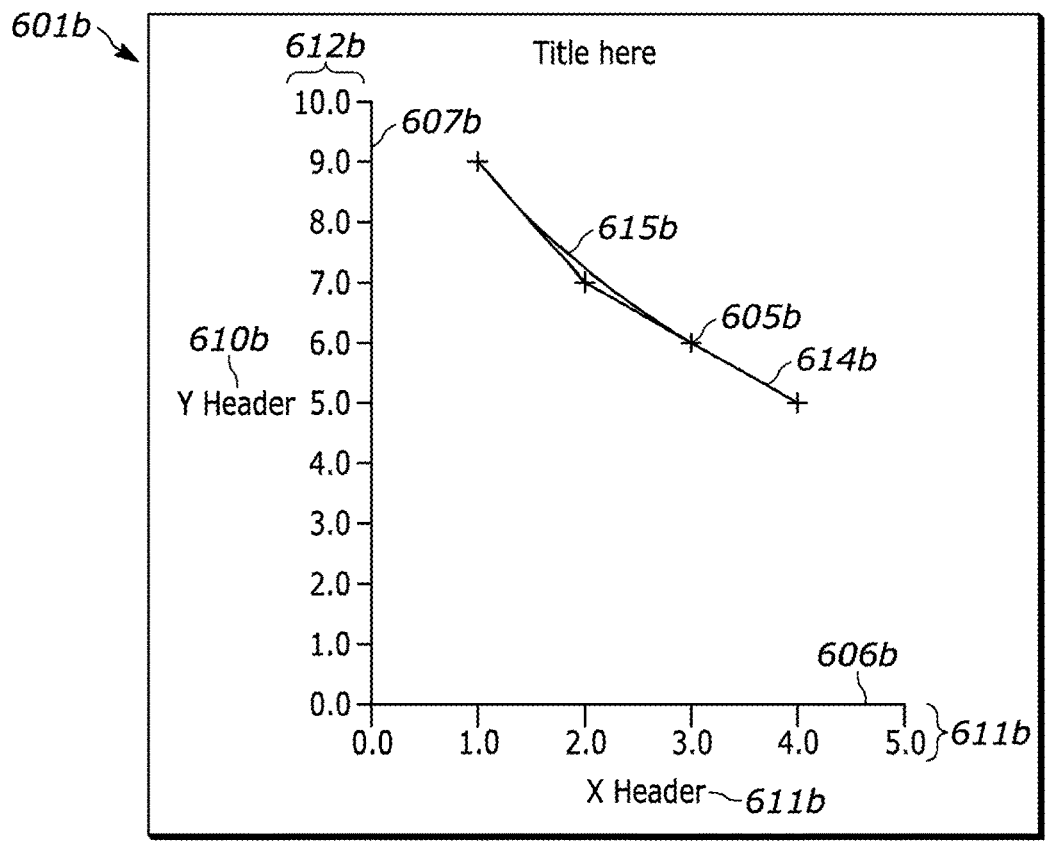

Referring now to FIG. 7a and FIG. 7b, a show items pane 601a within the integrated toolbox feature 212c is depicted in relation to a 2d scalable CAD graph 601b drawn by a CAD graph plotter and replicator tool 57 from underlying data points 102a, 103b. In the embodiments shown in FIGS. 7a, 7b, the show points toggle 604a as well as the show rules toggle 603a and show line toggle 613a from the toggle array 602a have been selected, thus in the embodiments shown, the 2d CAD graph 601b is drawn by a CAD graph plotter and replicator tool 57 from underlying data points in 2d scalable graphics with plot points 605b, plot lines 614b, an X Axis 606b, an X Axis rule 611b, a Y Axis 607b, a Y Axis rule 612b, a chart title 609b, an X axis label 608b, a Y axis label 610b, but no grid lines. In the embodiments shown, a show smoothened toggle 614a is selected. Selection of the show smoothened toggle 614b may induce the CAD graph plotter and replicator tool 57 to draw a smoothened approximation 615b of underlying data points 102a, 103b in 2d scalable graphics using curved lines. A smoothened approximation 615b may be configurable to be a more smoothened or less smoothened approximation 615b of the underlying data points 102a, 103b by use of a degree input 616a.

Figure 8A:
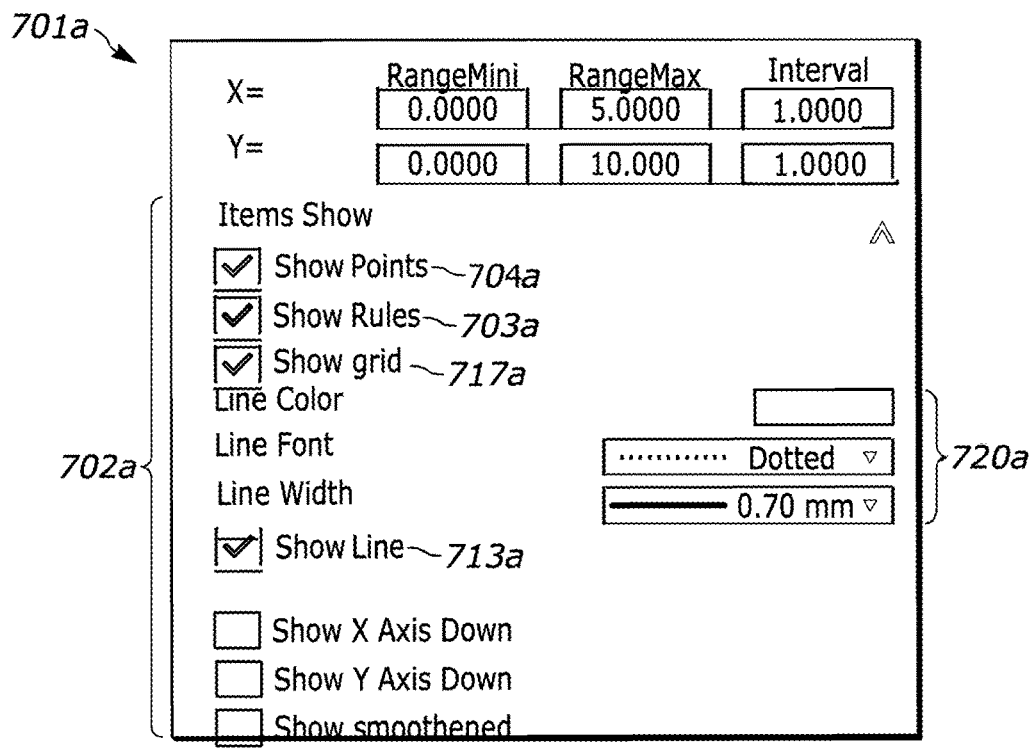
FIG. 8a depicts an integrated tool box feature, comprising a number of toggles, wherein a five toggles are selected.
Figure 8B:
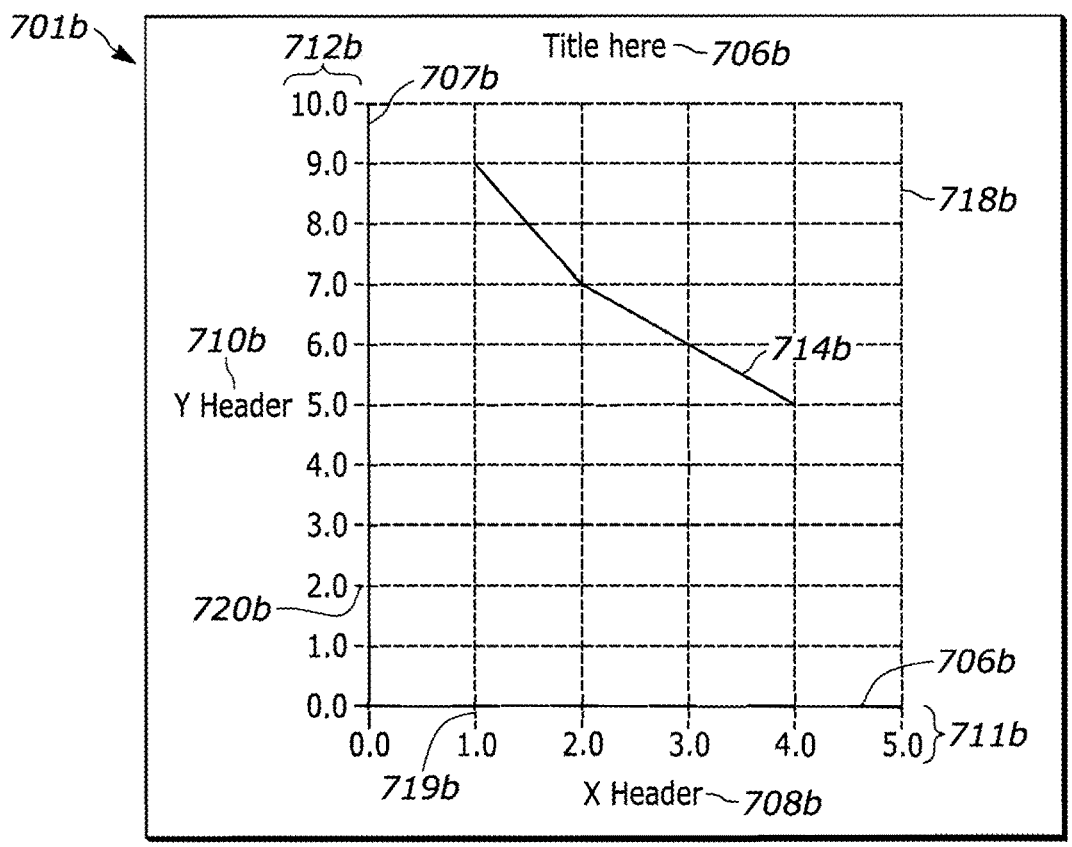

Referring now to FIG. 8a and FIG. 8b, a show items pane 701a within the integrated toolbox feature 212c is depicted in relation to a 2d scalable CAD graph 701b drawn by the CAD graph plotter and replicator tool 57 from underlying data points 102a, 103b. In the embodiments shown in FIGS. 8a, 8b, the show points toggle 704a as well as the show rules toggle 703a, show line toggle 713a, and show grid toggle 717a from the toggle array 702a have been selected, thus in the embodiments shown, the 2d CAD graph 701b is drawn by a CAD graph plotter and replicator tool 57 from underlying data points 102a, 103b in 2d scalable graphics with plot lines 714b, an X Axis 706b, an X Axis rule 711b, a Y Axis 707b, a Y Axis rule 712b, a chart title 706b, an X axis label 708b, a Y axis label 710b, and grid lines 718b. As can be seen from FIGS. 8a, 8b, a show grid toggle 717a may be selected, which may induce the CAD graph plotter and replicator tool 57 to draw grid lines 718b in 2d scalable graphics on the 2d scalable CAD graph 701b. The grid lines 718b may coincide with tick marks 719b, 720b on the X or Y axis 706b, 707b. A number of editable grid line options 720a may be available in the integrated toolbox feature 212c such as but not limited to a line color option, a line font option, or a line width option. The editing of the grid line options 720a may induce the CAD graph plotter and replicator tool 57 to redraw the 2d CAD graph 701b according to the grid line options 720a selected.

As should be apparent from the above description, each of the graphs, panes, and other elements in FIGS. 3a through 8b may be generated by the electronic processor 51 (e.g., executing the tool 57) and displayed, for example, on the electronic display 58 by the electronic processor 51 via the input/output interface 53. Additionally, the electronic processor 51 (e.g., executing the tool 57) is configured to receive the various user inputs described with respect to FIGS. 3a through 8b (e.g., toggle inputs, numerical inputs, drop down menu selections, slider drags, and the like) via the user interface 54, such as via the display 58 (e.g., when the display 58 takes the form of a touch screen display) a mouse, keyboard, or other elements making up the user interface 54.

Figure 9:
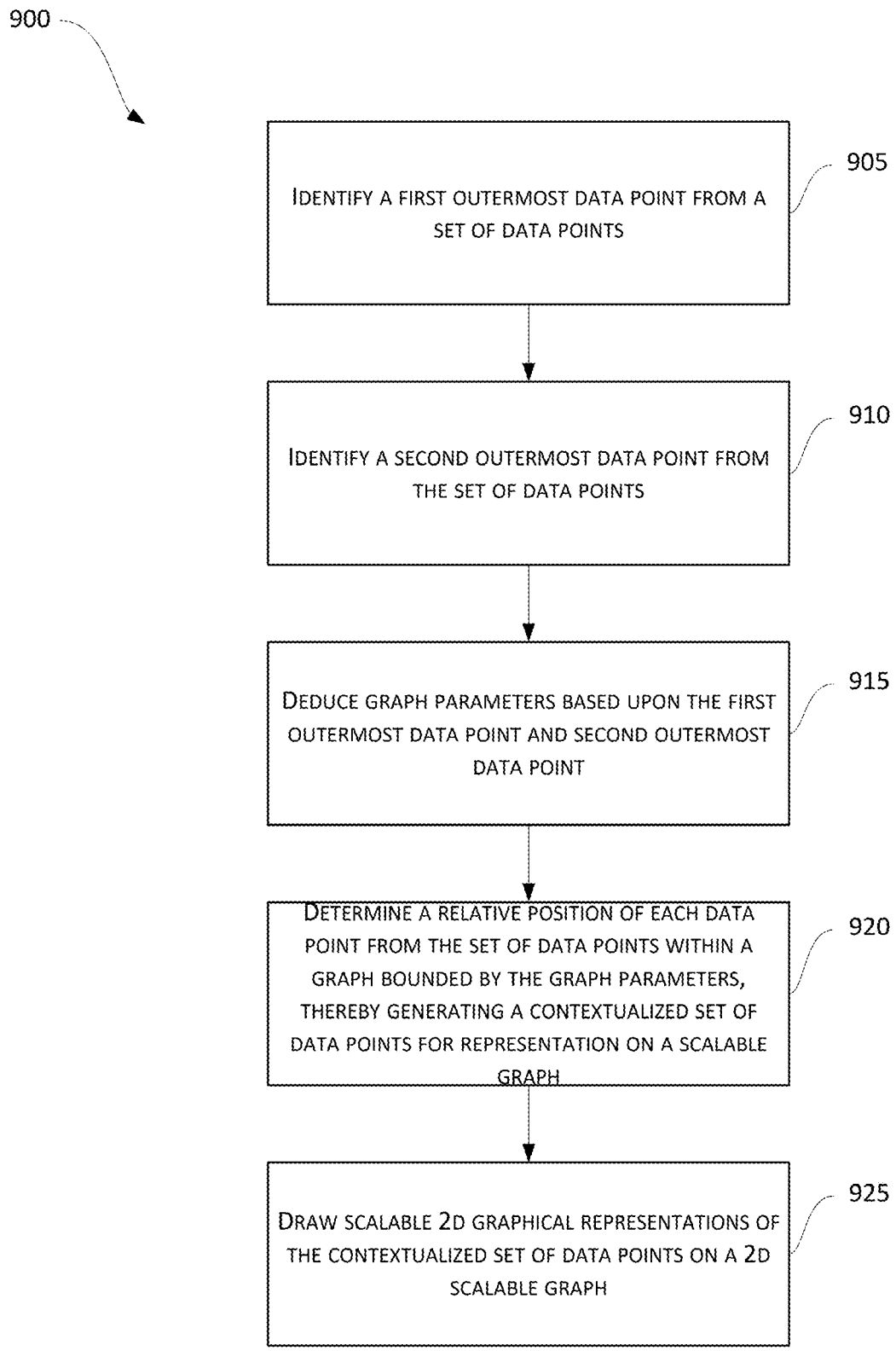
FIG. 9 depicts a flowchart of a method for generating a 2d scalable CAD graph, according to a number of embodiments.

Referring now to FIG. 9, a flowchart 900 for generating a 2d scalable CAD graph by the CAD graph plotter and replicator tool 57 executed by the electronic processor 51, according to a number of embodiments, is shown. The flowchart 900 is described with respect to the system 100 of FIG. 1; however, in some embodiments, the flowchart is implemented by other systems.

At block 905, the electronic processor 51 identifies a first outermost data point from a set of data points. As discussed in further detail herein, the set of data points may be received by the electronic processor 51 via the input/output interface 53 from an external source, may be received from the memory 52, or a combination thereof. The electronic processor 51 may identify the first outermost data point by iterating through each data point in the set of data points to identify a data point having a coordinate associated with a first axis having the largest absolute value. The coordinate having the largest absolute value may thus be identified as belonging to a data point being farthest from a graph origin along the first axis, which may be the first outermost data point.

At block 910, the electronic processor 51 identifies a second outermost data point from the set of data points. The electronic processor 51 may identify the second outermost data point by again iterating through each data point in the set of data points to identify a data point having a coordinate associated with a second axis having the largest absolute value. The coordinate having the largest absolute value may thus be identified as belonging to a data point being farthest from a graph origin along the second axis, which may be the second outermost data point. In some cases, the electronic processor 51 may be configured to identify both the first outermost data point and the second outermost data point in a single iteration through each data point. This may be accomplished in a number of ways such as, but not limited to, an examination of both coordinates of each data point and performing a conditional assignment of the coordinate value to a respective variable for each axis based upon the absolute value of the coordinate associated with each axis. In some embodiments, another sort algorithm is used to accomplish the same goal.

At block 915, the electronic processor 51 deduces graph parameters based upon the first outermost data point and second outermost data point. The electronic processor 51 may deduce graph parameters by using the coordinates of the identified outermost first and second data points to determine a frame for the graph to be drawn. Specifically, the electronic processor may identify a first outermost coordinate for the first outermost data point, and a second outermost coordinate for the second outermost data point, and use the first and second outermost coordinates as a minimum relative length and width of the graph to be drawn. A first and second axis of the graph may be drawn by the electronic processor 51 on this basis to form a graphing frame. In this way, the electronic processor 51 may ensure that every point in the data point set is included by default and no data point is drawn outside of the graphing frame created by the first and second axis. In some cases, graph parameters are entered by a user via the input-output interface 53. In such cases, the electronic processor 51 may use the graph parameters input by the user as the graph parameters.

At block 920, the electronic processor 51 determines a relative position of each data point from the set of data points within a graph bounded by the graph parameters. By determining the relative positions, the electronic processor 51 generates a contextualized set of data points for representation on a scalable graph. To determine the relative position of each data point, the electronic processor 51 may determine where each data point from the set of data points lies relative to the first and second axis, within the graphing frame formed by the first and second axis by determining a new, scaled coordinate system for the set of data points based upon the first and second axis. Upon determination of the new coordinate system, the electronic processor may determine the positions of each data point from the set of data points. These newly determined positions may be used by the electronic processor 51 as contextualized relative positions for each data point when drawing scalable 2d scalable representations of each data point on a 2d scalable graph at block 925.

At block 925, the electronic processor 51 draws scalable 2d graphical representations of the contextualized set of data points on a 2d scalable graph. The electronic processor 51, using the determined relative positions of the data points within the graphing frame formed by the first and second axis, may begin rendering 2d graphical representations of each data point for which a relative position was determined. These 2d graphical representations may be interpreted by the electronic display 58 and may be displayed in accordance with a resolution of the electronic display 58 as well as a viewing zoom level within the tool 57 that is being used by the electronic processor 51 to make such representations. In some cases, the 2d scalable graph is saved in memory 52, or saved as a file for later access. The 2d scalable graph may also be output to a remote or external device in any format such as, but not limited to, a file or an image via input-output interface 53.

In some embodiments, the electronic processor 51 receives user input via the user interface 54 indicating request for a rescaling operation, which may be received by the CAD graph plotter and replicator tool 57. In response, this request may be handled by the electronic processor 51 as described in the description of FIGS. 3*a*, 3*b*, and 3*c*. During operation of the tool 57 (e.g., while the 2d scalable graph is being displayed), the electronic processor 51 may also receive user input via the user interface 54 indicating a request for a show points operation. In response, this request may be handled by the electronic processor 51 as described in the description of FIGS. 4*a* and 4*b*. Similarly, the electronic processor 51 may receive a user request for a show rules operation via the user interface 54. In response, this request may be handled by the electronic processor 51 as described in the description of FIGS. 5*a* and 5*b*. The electronic processor 51 may also receive user input via the user interface 54 indicating a request for a show line operation. In response, this request may be handled by the electronic processor as described in the description of FIGS. 6*a* and 6*b*. In additional embodiments, the electronic processor 51 may also receive user input via the user interface 54 indicating request for a show smoothened operation. In response, this request may be handled by the electronic processor 51 as described in the description of FIGS. 7*a* and 7*b*. Still further, the electronic processor 51 may receive user input via the user interface 54 indicating request for a show grid lines operation. In response, this request may be handled by the electronic processor as described in the description of FIGS. 8*a* and 8*b*. Any of these requests, and additional requests may be received and handled simultaneously.

As noted above, at the outset of the flowchart 900, the set of data points may be received by the electronic processor 51. In some embodiments, to obtain the set of data points, the electronic processor 51 extracts a set of data points and axis labels from a data entry pane in a user interface, as described above (see, e.g., FIG. 2a). The electronic processor 51 may read the data points and axis labels directly from the data entry pane and utilize them in the drawing process, or may extract the data points and axis labels from the data entry pane and store them in memory for access at a later time. In other embodiments, the electronic processor 51 may read data points from an input file by first identifying the input file time, as described above (see, e.g., FIG. 2b). In still other embodiments, to obtain the set of data points, the electronic processor 51 extracts the set of data points based on a graph image (see, e.g., FIGS. 2c and 2d). As discussed in further detail above, the extraction includes identifying a first axis and a second axis within the graph image, and identifying a graph plot within the graph image. As also discussed above, the extraction further includes correlating the graph plot to the first axis and second axis at a plurality of locations along the graph plot; and generating a data point for each location from the plurality of locations at which the graph plot was correlated to the first and second axis.

Various features and advantages of the invention are set forth in the following claims.

What is claimed is:

1. A CAD graph plotter and replicator tool comprising:
an input-output interface;
a memory;
an electronic processor coupled to the input-output interface and the memory, the electronic processor configured to:
identify a first outermost data point from a set of data points, the outermost data point being a data point farthest from a graph origin along a first axis;
identify a second outermost data point from the set of data points, the outermost data point being a data point farthest from the graph origin along a second axis;
deduce graph parameters based upon the first outermost data point and second outermost data point; and
determine a relative position of each data point from the set of data points within a graph bounded by the graph parameters, thereby generating a contextualized set of data points for representation on a scalable graph; and
draw scalable 2d graphical representations of the contextualized set of data points on a 2d scalable graph.

2. The CAD graph plotter and replicator tool of claim 1 wherein the electronic processor is configured to produce the contextualized set of data points by construing data points that are numerically adjacent along the first axis as neighboring data points, and
wherein the electronic processor is further configured to draw scalable 2d lines between each of the neighboring data points.

3. The CAD graph plotter and replicator tool of claim 1 wherein the electronic processor is configured to produce the contextualized set of data points by construing data points that are sequentially adjacent within the input data points as neighboring data points, and
wherein the electronic processor is further configured to draw scalable 2d lines between each of the neighboring data points.

4. The CAD graph plotter and replicator tool of claim 1 wherein the input-output interface is coupled to a display configured to render a graphical user interface including a toolbox configured to change the manner in which the 2d scalable CAD graph is displayed in response to user input.

5. The CAD graph plotter and replicator tool of claim 4 wherein the electronic processor is configured to adjust a scale of the first axis or second axis in response to an input received via the toolbox.

6. The CAD graph plotter and replicator tool of claim 4 wherein the electronic processor is configured to adjust a ratio of a first scale of the first axis to a second scale of the second axis in response to an entry of a numerical ratio via the toolbox.

7. The CAD graph plotter and replicator tool of claim 4 wherein the electronic processor is configured to induce the display to show or hide grid lines, plot lines, axis rules, or plot points in response to a selection or deselection of an associated toggle in the toolbox.

8. The CAD graph plotter and replicator tool of claim 1 wherein the electronic processor is further configured to extract the set of data points based on a graph image by:
identifying a first axis image and a second axis image within the graph image;
identifying a graph plot within the graph image;
correlating the graph plot to the first axis image and second axis image at a plurality of locations along the graph plot; and
generating a data point for each location from the plurality of locations at which the graph plot was correlated to the first and second axis images.

9. The CAD graph plotter and replicator tool of claim 4 wherein the electronic processor is configured to produce a smoothened plot approximation of the contextualized data points using a curve in response to a selection or deselection of an associated toggle in the toolbox.

10. A method of producing a 2d scalable CAD graph comprising:
identifying, by an electronic processor, a first outermost data point from a set of data points, the outermost data point being a data point farthest from a graph origin along a first axis;
identifying, by the electronic processor, a second outermost data point from the set of data points, the outermost data point being a data point farthest from the graph origin along a second axis;
deducing, by the electronic processor, graph parameters based upon the first outermost data point and second outermost data point; and
determining, by the electronic processor, a relative position of each data point from the set of data points within a graph bounded by the graph parameters, thereby generating a contextualized set of data points for representation on a scalable graph; and
drawing, by the electronic processor, scalable 2d graphical representations of the contextualized set of data points on a 2d scalable graph.

11. The method of claim 10 further comprising reading, by the electronic processor, the set of data points from an input file.

12. The method of claim 10 further comprising extracting, by the electronic processor, the set of data points based on a graph image.

13. The method of claim 12 wherein extracting, by the electronic processor, the set of data points based on a graph image includes:
identifying a first axis image and a second axis image within the graph image;
identifying a graph plot within the graph image;

correlating the graph plot to the first axis image and second axis image at a plurality of locations along the graph plot; and generating a data point for each location from the plurality of locations at which the graph plot was correlated to the first and second axis images.

14. The method of claim 13 wherein the quantity of locations at which the graph plot is correlated to the first axis image and second axis image is selectable by a user via a user interface.

15. The method of claim 10 further comprising:

drawing, by the electronic processor, a 2d scalable first axis to fit the contextualized set of data points within the graph bounded by the graph parameters, and drawing, by the electronic processor, a 2d scalable second axis to fit the contextualized set of data points within the graph bounded by the graph parameters.

16. The method of claim 12 wherein drawing, by the electronic processor, the scalable 2d graphical representations of the contextualized set of data points on the 2d scalable graph comprises drawing a scalable 2d line between the relative positions of two data points from the contextualized set of data points.

17. The method of claim 12 wherein drawing, by the electronic processor, the scalable 2d graphical representations of the contextualized set of data points on the 2d scalable graph comprises drawing a 2d scalable shape at the relative position of a data point from the contextualized set of data points.

18. A non-transitory, computer-readable medium containing instructions that, when executed by an electronic processor, are configured to perform a set of functions, the set of functions comprising:

identifying a first outermost data point from a set of data points, the outermost data point being a data point farthest from a graph origin along a first axis;

identifying a second outermost data point from the set of data points, the outermost data point being a data point farthest from the graph origin along a second axis;

deducing graph parameters based upon the first outermost data point and second outermost data point;

determining a relative position of each data point from the set of data points within a graph bounded by the graph parameters, thereby generating a contextualized set of data points for representation on a scalable graph; and drawing scalable 2d graphical representations of the contextualized set of data points on a 2d scalable graph.

19. The non-transitory, computer-readable medium of claim 18, further comprising instructions that, when executed by an electronic processor, are configured to perform a function of reading the set of data points from an input file.

20. The non-transitory, computer-readable medium of claim 18, further comprising instructions that, when executed by an electronic processor, are configured to perform a function of extracting the set of data points based on a graph image.

* * * * *